April 8, 1952     J. STOIBER     2,592,354
FILM DEVELOPING RACK
Filed Sept. 18, 1947
FIG. 1.
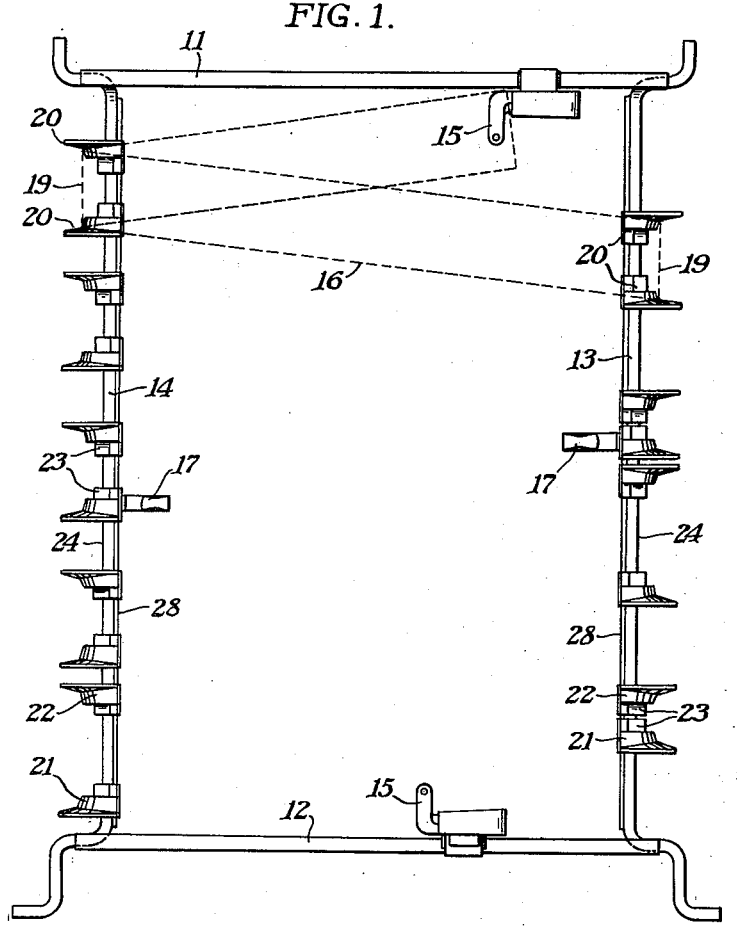
FIG. 2.
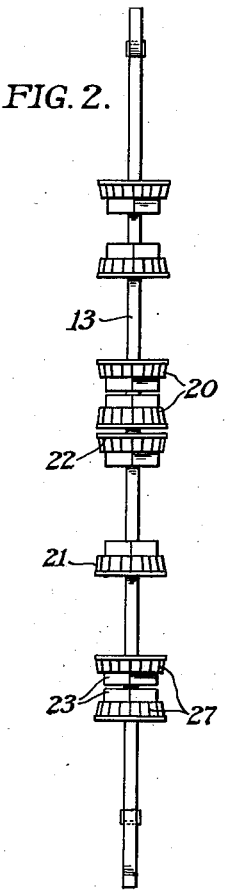
FIG. 3.    FIG. 4.    FIG. 5.
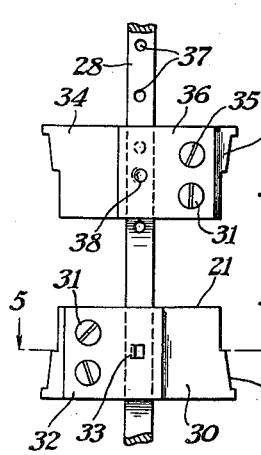 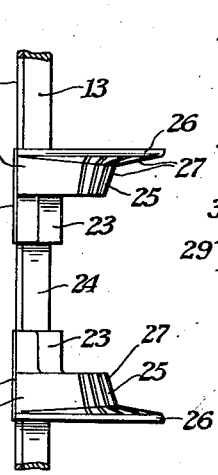 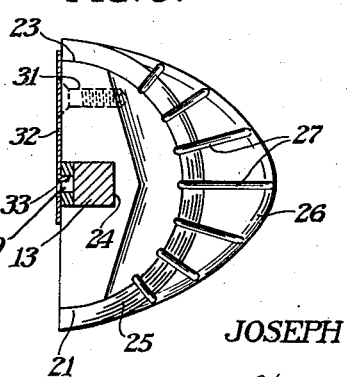
JOSEPH STOIBER
INVENTOR
BY
ATTORNEYS Patented Apr. 8, 1952

2,592,354

UNITED STATES PATENT OFFICE 2,592,354

FILM DEVELOPING RACK

Joseph Stoiber, Rochester, N. Y., assignor to Eastman Kodak Company, Rochester, N. Y., a corporation of New Jersey Application September 18, 1947, Serial No. 774,777

12 Claims. (Cl. 242—77)

1

The present invention relates to a photographic film developing apparatus, and more particularly to a film developing or processing rack adapted for use in developing or processing strips of photographic film.

The invention has as its principal object the provision of a rack formed with adjustable film supporting members which may be positioned selectively to support films of different widths.

A still further object of the invention is the provision of film supporting members which may be readily adjusted in width to suit the width of the particular film being used, and, when adjusted, are securely held in position, yet may be easily moved to vary the spacing thereof for use with a film of another width.

Yet another object of the invention is the provision of adjustable film supporting members which are simple in construction, rugged, easy and quick to adjust, releasably retained in adjusted position, and highly effective in use.

To these and other ends, the invention resides in certain improvements and combinations of parts, all as will be hereinafter more fully described, the novel features being pointed out in the claims at the end of the specification.

In the drawings:

Fig. 1 is a front elevational view of a photographic film developing rack, showing the relation thereto of the two-part film supporting members constructed in accordance with the present invention;

Fig. 2 is a side elevation of the rack illustrated in Fig. 1;

Fig. 3 is a bottom or inner view of a pair of the film supporting parts which form one of the film supporting members, showing the arrangement for fixing one of the parts to the rack and the positioning means for the other part;

Fig. 4 is a side view of the parts illustrated in Fig. 3, adjusted for one width of film; and Fig. 5 is a transverse sectional view through the fixed part of one of the supporting members and taken substantially on line 5—5 of Fig. 3, and on a larger scale than the latter, showing the arrangement for retaining one of the parts in fixed relation on the rack or frame.

Similar reference numerals throughout the various views indicate the same parts.

The rack of the present invention is formed of any suitable material, preferably metal rods, to provide a hollow rectangular frame having a top rail 11, a bottom rail 12 and opposite side rails 13 and 14. The top and bottom rails have slidably mounted thereon clips 15 which may be

2 secured to the ends of the film strip 16 when the latter is wound in position over the film supporting members, to be hereinafter more fully described. The side rails may also be provided with similar fixed clips 17 which are adapted to cooperate with the adjustable clips 15 when shorter lengths of film are to be mounted on the rack.

The intermediate portion 19 of the film strip 16 is wound or threaded in spiral relation over a plurality of film supporting members, generally indicated by the numeral 20, and mounted on the side rails 13 and 14, as clearly illustrated in Fig. 1. Each of the members 20 is formed of two identical shaped parts 21 and 22, the former being fixed on the side rails 13 and 14 and the latter being slidable thereon, in a manner to be later described. As each of the parts 21 and 22 are identical in construction, except as later pointed out, only one will be described in detail, and corresponding elements of the other part will be designated by the same numerals.

Each part 21 and 22 has axially extending boss 23 which engages and slides on the outer face or surface 24 of the side rails 13 and 14, as best shown in Fig. 4. A substantially semi-cylindrical film-engaging portion 25 is formed integral with and extends outwardly from the boss and terminates in a flange 26. When the parts 21 and 22 have been adjusted, as will be later described, to space the parts in accordance with the width of the particular film used, the marginal edges of the film 16 will be supported on the portions 25 while the flanges 26 will engage the edges of the strip 16 to retain the latter in a lateral position on the parts 21 and 22, as will be readily apparent from an inspection of Fig. 1. The flanges 26 and supporting parts 25 are formed with projecting ribs 27 which serves to support and space the greater portion of the film strip from the portions 25 and flanges 26 to permit the free passage of the treating solution over the surfaces of the parts of the film on the supporting members, all of which will be readily apparent from an inspection of the drawings.

In order that the rack may be used with several different film widths, for example, 35-mm., 45-mm., 50-mm., 60-mm. and 70-mm. films, the parts 21 and 22 are so mounted on the side rails 13 and 14 that they may be moved relative to each other to vary the spacing between the parts 25 and flanges 26 to suit the particular film width being processed. Obviously, the spacing between the parts will be different for the different films. While it is contemplated that such spacing may be secured by moving both parts 21 and 22, it is preferred to mount one of the parts in fixed relation on the side rails and to secure the desired variation in spacing or width by moving only one of the parts.

To this end, each part 21 is mounted in fixed relation on the side rail. To secure this result, the inner side or face 28 of each side rail is formed with apertures 29. Each part 21 has fixed to the inner face 30 thereof, by means of screws 31, a plate 32 of spring material which overlies the side 28 of the side rail. This plate is provided with a formed-up tongue or lug 33 which extends into a registering opening 29, to fixedly mount part 21 on the side rail. Thus each part 21 of each film supporting member 20 is secured in fixed relation on the respective side rail, as clearly shown in Figs. 3 and 5.

The necessary variation in spacing between the parts 21 and 22 is secured by slidably mounting the part 22 on the side rails so that said part 22 can be moved toward or away from the fixed part 21. This slidable connection is provided by mounting on the inner face 34 of the part 22, by screws 35, a spring plate 36 which overlies and engages the face 28 of the side rail. Thus the part 22 and its plate 36 engage opposite sides or faces of the side rail to provide a slidable connection between the movable part 22 and the side rail.

In order that the movable part may be quickly and easily moved to its position of adjustment, and also securely retained in said position, the present invention provides a series of cooperating "click" stop members on the side rails and the movable part 22. In the preferred embodiment, these "click" stops comprise a series of spaced spherical recesses 37 formed in the face 28 of the side rail, and an inwardly-extending spherical nib or protuberance 38 carried by the plate 36 of each part 22 and adapted to engage selectively in one of the recesses 37, both to position the part 22 and to hold the latter releasably in its adjusted position. Thus when the part 22 has been moved to one of its positions of adjustment, the protuberance 38 will register with one of the recesses 37 and will move therein under the action of the spring plate 36. The recesses 37 are so spaced that the engagement of the protuberance 38 therein will properly space the parts 21 and 22 for the particular film. For example, the engagement of the protuberance in the lower recess, Fig. 3, will space the parts 21 and 22 for 35-mm. film, while the engagement in the next recess will space the parts for 45-mm. film. The succeeding recesses are used for 50-mm., 60-mm., and 70-mm. films respectively.

Thus, by means of the "click" stops, the part 22 may be quickly and easily moved to its proper position, and when so positioned is securely held. However, when a film of a different width is to be processed, it is merely necessary to shift the member 22 to bring the protuberance 38 into cooperating relation with the proper recess 37. In order that the operator may readily distinguish the movable part 22 from the fixed part 21, the parts are preferably differently colored. For example, the fixed part 21 may be colored blue, while the adjustable or movable part 22 may be colored yellow. Obviously any other suitable color arrangement may be used. While each of the side rails 13 and 14 may be formed of one piece of material and the openings 29 for the tongue 33 and the recesses 37 for the protuberance 38 formed directly therein, for manufacturing purposes it is desirable to form the openings and recesses in a separate piece which is then secured to the inner surface of each side rail. Such two-part construction is clearly indicated in Figs. 1 and 5.

The present invention thus provides a developing or processing rack adapted for use with films of different widths. To secure this result, adjustable film supporting members are provided. These members may be readily and quickly adjusted to provide the desired spacing of the particular film and are then securely held in adjusted position until positively moved to vary the spacing for a film of a different width. The parts are simple in construction, rugged, easy to operate, and highly effective in operation.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a film-developing rack, the combination with a frame, of a plurality of separately adjustable film-supporting members spaced laterally and longitudinally on said frame and over which a film strip is adapted to be threaded, each of said members comprising parts which support the strip only at a longitudinal point intermediate its ends and which are relatively adjustable on said frames to vary the spacing between the parts to accommodate film strips of different widths.

2. In a film-developing rack, the combination with a frame, of a plurality of separate film-supporting members carried by said frame and over which a film strip is adapted to be threaded independently of said frame so that the film is supported solely on said members, each of said members comprising a part fixed on said frame and a part movable on said frame relative to the fixed part to support said strip only at a longitudinal point intermediate its ends, said movable part being positionable to vary the spacing between said parts to accommodate films of different widths.

3. In a film-developing rack, the combination with a frame formed with spaced rails, of a plurality of film-supporting members carried by and spaced along each of said side rails and over which a film strip is adapted to be threaded, each of said members comprising two parts to support said strip intermediate its ends, means for securing one of said parts in fixed position on an adjacent side rail, the other of said parts being movable on said adjacent rail and relative to said fixed part to adjust the spacing between said parts to adapt said member to film strips of different widths.

4. In a film-developing rack, the combination with a rectangular open frame having spaced side rails, of a plurality of film-supporting members carried by and spaced along each of said side rails and over which a film strip is adapted to be threaded, each of said members comprising two parts to support said strip intermediate its ends, cooperating elements on one of said parts and an adjacent side rail for securing said one part in fixed relation on said adjacent rail, the other of said parts being slidably mounted on said adjacent rail for movement relative to said first part to vary the spacing between said parts to adapt said members for use with film strips of different widths.

5. In a film-developing rack, the combination with a frame, of a plurality of film-supporting members carried by said frame and over which a film strip is adapted to be threaded, each of said members comprising two parts, means including a spring clip for securing one of said parts in fixed position on said frame, and means for mounting the other of said parts for sliding movement on said frame so that said other part may be adjusted relative to said one part to vary the spacing therebetween to adapt said members for use with films of different widths.

6. In a film-developing rack, the combination with a frame, of a plurality of film-supporting members carried by said frame and over which a film strip is adapted to be threaded, each of said members comprising two parts, means including a spring clip for securing one of said parts in fixed position on said frame, means for mounting the other of said parts for sliding movement on said frame so that said other part may be adjusted relative to said one part to vary the spacing therebetween to adapt said members for use with films of different widths, and means for retaining said other member in its adjusted position.

7. In a film-developing rack, the combination with a frame, of a plurality of film-supporting members carried by said frame and over which a film strip is adapted to be threaded, each of said members comprising two parts to engage and support the strip intermediate its ends, means including a spring clip for securing one of said parts in fixed position on said frame, means for mounting the other of said parts for sliding movement on said frame so that said other part may be adjusted relative to said one part to vary the spacing therebetween to adapt said members for use with films of different widths, and cooperating means on said frame and said adjustable member for retaining the latter selectively in adjusted position.

8. In a film-developing rack, the combination with a frame, of a plurality of film-supporting members carried by said frame and over which a film strip is adapted to be threaded, each of said members comprising two parts to engage and support the strip intermediate its ends, said frame being provided with a series of apertures, one of each of said parts having a spring clip, a tongue formed on said clip and extending into one of said apertures to retain said one part in fixed relation on said frame, and means for mounting the other of said parts for sliding movement on said frame so that the spacing between said parts may be adjusted to adapt the members to films of different widths.

9. In a film-developing rack, the combination with a frame, of a plurality of film-supporting members carried by said frame and over which a film strip is adapted to be threaded, each of said members comprising two parts, said frame being provided with a series of apertures, one of each of said parts having a spring clip, a tongue formed on said clip and extending into one of said apertures to retain said one part in fixed relation on said frame, means for slidably mounting said other part on said frame for varying the spacing between said parts to suit said member to films of different widths, and means for retaining said slidable part in adjusted position.

10. In a film-developing rack, the combination with a frame, of a plurality of film-supporting members carried by said frame and over which a film strip is adapted to be threaded, each of said members comprising two parts, said frame being provided with a series of apertures, one of each of said parts having a spring clip, a tongue formed on said clip and extending into one of said apertures to retain said one part in fixed relation on said frame, means for slidably mounting said other part on said frame for varying the spacing between said parts to suit said member to films of different widths, a series of recesses formed in said frame, a spring member carried by said other part, and a protuberance formed on said spring member and adapted to engage selectively in one of said recesses to retain said other part releasably in adjusted position.

11. In a film-developing rack, the combination with a hollow rectangular frame, of a plurality of film-supporting members carried by said frame and over which a film strip is adapted to be threaded, each of said members comprising a pair of semi-cylindrical parts mounted on said frame, means for anchoring one of said parts in fixed relation on said frame, means for slidably mounting the other part on said frame for axial movement relative to said fixed part to vary the spacing therebetween to adapt said members for use with films of different widths, and cooperating click-stop members on said frame and slidable member for retaining the latter releasably in adjusted position.

12. In a film-developing rack, the combination with a hollow rectangular frame, of a plurality of film-supporting members carried by said frame and over which a film strip is adapted to be threaded, each of said members comprising a semi-cylindrical element supported on said frame, said element being split radially to provide a pair of identical semi-cylindrical film-supporting parts, a marginal flange carried by each of said parts to provide a lateral guide for said strip, means for securing one of said parts in fixed relation on said frame, means for mounting the other part slidably on said frame so that said parts may be moved relatively to vary the spacing therebetween to support films of different widths, and cooperating parts on said other part and said frame for retaining said other part releasably in a selected position of adjustment.

JOSEPH STOIBER.

REFERENCES CITED

The following references are of record in the file of this patent:

UNITED STATES PATENTS

| Number | Name | Date |
|---|---|---|
| 1,034,467 | Kieser | Aug. 6, 1912 |
| 1,553,903 | Lefebvre | Sept. 15, 1925 |
| 2,341,666 | Spota | Feb. 15, 1944 |
| 2,397,010 | Jacobson | Mar. 19, 1946 |